United States Patent
Kim et al.

(10) Patent No.: US 9,750,029 B2
(45) Date of Patent: Aug. 29, 2017

(54) CONTROLLING UPLINK TRANSMISSION POWER USING OFFSET VALUE BASED ON ANTENNA NUMBER OR DIVERSITY SCHEME

(71) Applicant: LG Electronics Inc., Seoul (KR)

(72) Inventors: Dong Cheol Kim, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 50 days.

(21) Appl. No.: 14/697,751

(22) Filed: Apr. 28, 2015

(65) Prior Publication Data
US 2015/0245355 A1    Aug. 27, 2015

Related U.S. Application Data

(63) Continuation of application No. 13/579,751, filed as application No. PCT/KR2011/001084 on Feb. 18, 2011, now Pat. No. 9,037,183.
(Continued)

(51) Int. Cl.
*H04W 72/04* (2009.01)
*H04W 52/42* (2009.01)
(Continued)

(52) U.S. Cl.
CPC ...... *H04W 72/0473* (2013.01); *H04B 7/0404* (2013.01); *H04B 7/0697* (2013.01);
(Continued)

(58) Field of Classification Search
None
See application file for complete search history.

(56) References Cited

U.S. PATENT DOCUMENTS 8,649,793 B2   2/2014 Hu .................. 455/522 X
2006/0092870 A1*  5/2006 Kondou ............ H04W 52/12
                                                        370/318
(Continued)

FOREIGN PATENT DOCUMENTS

EP           1124340         8/2001
KR       10-2004-0027960     4/2004
WO         WO 00-74289      12/2000

OTHER PUBLICATIONS

"3rd Generation Partnership Project; Technical specification group radio access network; Evolved universal terrestrial radio access (E-UTRA); Physical layer procedures (Release 9)", 3GPP Strandard; 3GPP TS 36.213, 3rd Generation Partnership Project (3GPP), Mobile Competence Cetnre; 650, Route Des Lucioles; F-06921 Sophia-Antipolis Cedex; France, No. V9.0.1, Dec. 17, 2009, pp. 1-81, XP050401048.

Motorola: "UL power control for multi-antenna UE", 3GPP Draft; R1-101115 UL power control for multi-antenna UE (Final clean), 3rd Generation Partnership Project (3GPP), Mobile Competence Cetnre; 650, Route Des Lucioles; F-06921 Sophia-Antipolis Cedex; France, vol. RAN WG1, No. San Francisco, USA; Feb. 22, 2010, Feb. 16, 2010, XP050418668.

(Continued)

*Primary Examiner* — Edan Orgad
*Assistant Examiner* — Saumit Shah
(74) *Attorney, Agent, or Firm* — Dentons US LLP

(57) ABSTRACT

Disclosed are a terminal device for controlling uplink transmission power and a method therefor. A receiving antenna receives uplink transmission mode change information from a base station. A processor determines a transmission power value to be used for the uplink transmission by means of an offset value corresponding to the uplink transmission mode change information. A transmitting antenna transmits an uplink signal with the determined transmission power value.

12 Claims, 13 Drawing Sheets

Related U.S. Application Data

(60) Provisional application No. 61/305,961, filed on Feb. 19, 2010.

(51) Int. Cl.
*H04W 52/36* (2009.01)
*H04B 7/0404* (2017.01)
*H04B 7/0413* (2017.01)
*H04B 7/06* (2006.01)
*H04W 52/14* (2009.01)

(52) U.S. Cl.
CPC ........... *H04W 52/36* (2013.01); *H04W 52/42* (2013.01); *H04W 72/0413* (2013.01); *H04B 7/0413* (2013.01); *H04B 7/0678* (2013.01); *H04W 52/146* (2013.01); *H04W 52/365* (2013.01)

(56) References Cited

U.S. PATENT DOCUMENTS

| | | | | |
|---|---|---|---|---|
| 2010/0322330 | A1* | 12/2010 | Jongren | H04B 7/0452 375/260 |
| 2011/0096815 | A1* | 4/2011 | Shin | H04B 7/0689 375/219 |

OTHER PUBLICATIONS

Meeting 3GPP RAN: "Source: Samsung title: Document for Discussion and Decision", 3GPP TSG RAN WG1 Meeting #60, San Francisco, USA, Feb. 22-26, 2010, Feb. 16, 2010, pp. 1-4, XP055126162.

* cited by examiner (a)

(b)

CONTROLLING UPLINK TRANSMISSION POWER USING OFFSET VALUE BASED ON ANTENNA NUMBER OR DIVERSITY SCHEME

This application is a continuation of application Ser. No. 13/579,751, filed Sep. 25, 2012, which claims the benefit of 35 U.S.C. §371 National Stage Entry of International Application No. PCT/KR2011/001084, filed Feb. 18, 2011 and claims the benefit of U.S. Provisional Application Nos. 61/305,961, filed Feb. 19, 2010, all of which are incorporated by reference in their entirety herein.

TECHNICAL FIELD

The present invention relates to a wireless communication, and more particularly, to an apparatus for controlling an uplink transmission power and method thereof.

BACKGROUND ART

Recently, MIMO (multiple input multiple output) system has been in the spotlight of the broadband wireless mobile communication technology. The MIMO system means the system that raises communication efficiency of data using multiple antennas. And, the MIMO system may be implemented using such an MIMO scheme as a spatial multiplexing scheme or a spatial diversity scheme in accordance with a presence of non-presence of transmission of the same data.

The spatial multiplexing scheme means the scheme for transmitting data at high speed by transmitting different data via a plurality of transmitting antennas simultaneously without increasing a bandwidth. The spatial diversity scheme means the scheme for obtaining transmission diversity by transmitting the same data via a plurality of transmitting antennas. Space time channel coding is an example for the spatial diversity scheme.

The MIMO technique can be also categorized into an open loop scheme and a closed loop scheme according to a presence or non-presence of feedback of channel information to a transmitting side from a receiving side. The open loop scheme includes a space-time trellis code (STTC) scheme for obtaining a transmission diversity and coding gain using BLAST and space region capable of extending an information size amounting to the number of transmitting antennas in a manner that a transmitting side transmits information in parallel and that a receiving side detects a signal using ZF (zero forcing) and MMSE (minimum mean square error) scheme repeatedly. And, the closed loop scheme includes a TxAA transmit antenna array) scheme or the like.

In a wireless channel environment, a channel state changes irregularly in time and frequency domains, which is called fading effect. Therefore, in order to reconstruct data transmitted from a transmitter and to obtain a correct signal, a receiver corrects a received signal using channel information.

A wireless communication system obtains channel information in a manner of transmitting a signal known to both of a transmitter and a receiver and then using an extent of distortion of the signal transmitted on a channel. This signal is called a reference signal (or a pilot signal). And, a process for obtaining the channel information is called channel estimation. The reference signal does not include data actually and has a high output of power. In case that data is transmitted and received using multiple antennas, it may be necessary to know a channel status between each transmitting antenna and each receiving antenna. Hence, a reference signal exists for each transmitting antenna.

In a legacy LTE system, a single antenna is used for an uplink (UL) control channel transmission. In LET-A system of a next generation mobile communication system, a multi-antenna transmission scheme is introduced to enhance performance of the UL control channel. It may be difficult to apply a UL transmission channel power in a legacy LTE system to an LTE-A system that uses a plurality of antennas. However, when the number of antennas used for a control channel transmission in LTE-A system changes or a transmit diversity scheme changes, any efforts has not been made to research and develop how to determine and control a UL transmission power.

DISCLOSURE OF THE INVENTION

Technical Tasks

One object of the present invention is to provide a method for a mobile station to control a UL transmission power.

Another object of the present invention is to provide a mobile station apparatus for controlling a UL transmission power.

Technical Solutions

To achieve these and other advantages and in accordance with the purpose of the present invention, as embodied and broadly described, a method of controlling an uplink transmission power, which is controlled by a mobile station in a wireless communication system, according to one embodiment of the present invention may include the steps of receiving a change information of an uplink transmission mode from an eNode B, determining a transmission power value to use for an uplink transmission using a previously defined offset value corresponding to the change information of the uplink transmission mode, and transmitting an uplink signal with the determined transmission power value.

Preferably, the change information of the uplink transmission mode may include at least one of an information on a changed antenna number for the uplink transmission and an information on a changed transmit diversity scheme for the uplink transmission.

More preferably, the previously defined offset value may include the changed antenna number indicated by the change information of the uplink transmission mode. More preferably, the previously defined offset value may include a value differing in accordance with the changed antenna number.

Preferably, the previously defined offset value may include a value set per specific time unit. More preferably, if the change information of the uplink transmission mode indicates a 2-antenna transmitting mode adopting 2 antennas, the uplink transmission power value may be determined using an offset value corresponding to the indicated mode and the uplink signal may be transmitted by a spatial orthogonal resource transmit diversity (SORTD) scheme via the 2 antennas. Preferably, the uplink transmission may include a PUCCH (physical uplink control channel) transmission. More preferably, the previously defined offset value may include a value defined per format of the PUCCH. More preferably, the previously defined offset value may include a value differing per the format of the PUCCH.

More preferably, the previously defined offset value may include a value corresponding o a transmit diversity scheme indicated by the transmission mode change information. In this case, the previously defined offset value may include a value differing per the indicated transmit diversity scheme.

To further achieve these and other advantages and in accordance with the purpose of the present invention, a mobile station apparatus, which controls an uplink transmission power in a wireless communication system, according to another embodiment of the present invention may include a receiving antenna configured to receive a change information of an uplink transmission mode from an eNode B, a processor determining a transmission power value to use for an uplink transmission using a previously defined offset value corresponding to the change information of the uplink transmission mode, and a transmitting antenna configured to transmit an uplink signal with the determined transmission power value.

Preferably, the change information of the uplink transmission mode may include at least one of an information on a changed antenna number for the uplink transmission and an information on a changed transmit diversity scheme for the uplink transmission.

Preferably, the uplink transmission may include a PUCCH (physical uplink control channel) transmission. More preferably, the previously defined offset value may include the changed antenna number indicated by the change information of the uplink transmission mode.

Advantageous Effects

In a UL transmission power controlling method according to the present invention, even if a transmission mode is changed in accordance with the number of transmitting antennas of a mobile station, a transmit diversity type change or the like, a received signal strength expected by a base station (i.e., eNode B) can be maintained or enhanced.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Reference will now be made in detail to the preferred embodiments of the present invention, examples of which are illustrated in the accompanying drawings. In the following detailed description of the invention includes details to help the full understanding of the present invention. However, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

In order to prevent the present invention from getting ambiguous, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. In this specification, although the following description is made based on 3GPP LTE/LTE-A system, the principles of the present invention may be applicable to other communication systems.

In a mobile communication system, a mobile station is able to receive information in downlink and is able to transmit information in uplink as well. Informations transmitted or received by the mobile station may include various kinds of data and control informations. In accordance with types and usages of the informations transmitted or received by the mobile station, various physical channels may exist.

Figure 1:
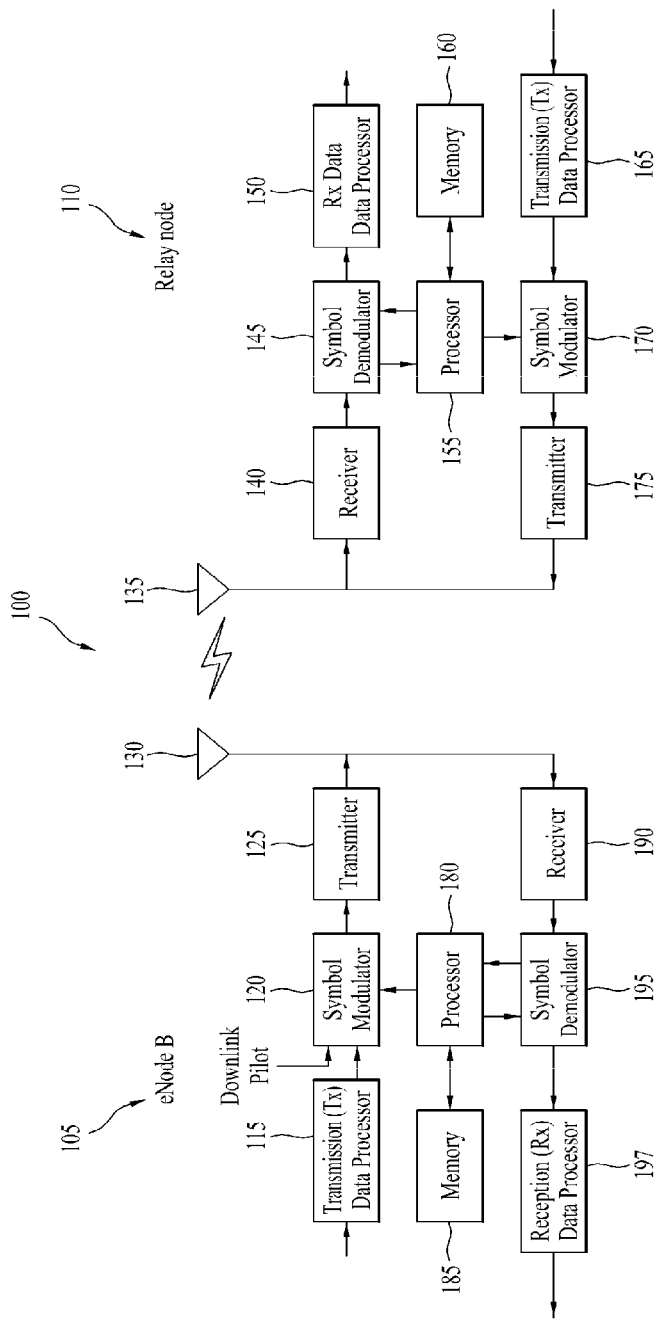
FIG. 1 is a block diagram for configurations of an eNode B 105 and a mobile station 110 in a wireless communication system 210.

FIG. 1 is a block diagram for configurations of an eNode B 105 and a mobile station 110 in a wireless communication system 100.

Although one eNode B 105 and one mobile station 110 are shown in the drawing to schematically represent a wireless communication system 100, the wireless communication system 100 may include at least one eNode B and/or at least one mobile station.

Referring to FIG. 1, an eNode B 105 may include a transmission (Tx) data processor 115, a symbol modulator 120, a transmitter 125, a transceiving antenna 130, a processor 180, a memory 185, a receiver 190, a symbol demodulator 195 and a received data processor 197. And, a mobile station 110 may include a transmission (Tx) data processor 165, a symbol modulator 170, a transmitter 175, a transceiving antenna 135, a processor 155, a memory 160, a receiver 140, a symbol demodulator 155 and a reception (Rx) data processor 150. Although the eNode B/mobile station 105/110 is illustrated as including one antenna 130/135 in the drawing, each of the eNode B 105 and the mobile station 110 includes a plurality of antennas. Therefore, each of the eNode B 105 and the mobile station 110 according to the present invention supports an MIMO (multiple input multiple output) system. And, the eNode B 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (i.e., data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol period, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the mobile station via the antenna 130.

In the configuration of the mobile station 110, the antenna 135 receives the downlink signal from the eNode B and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the reception (Rx) data processor 150. The reception (Rx) data processor 150 reconstructs the transmitted traffic data by performing demodulation (i.e., symbol demapping, deinterleaving and decoding) on the data symbol estimated values.

The processing by the symbol demodulator 145 and the processing by the reception (Rx) data processor 150 are complementary to the processing by the symbol modulator 120 and the processing by the transmitted data processor 115 in the eNode B 105, respectively.

In the mobile station 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the eNode B 105 via the antenna 135.

In the eNode B 105, the uplink signal is received from the mobile station 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the mobile station 110.

The processor 155/180 of the mobile station/eNode B 110/105 directs operations (e.g., control, adjustment, management, etc.) of the mobile station/eNode B 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

In case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a mobile station and an eNode B may be classified into a first layer L1, a second layer L2 and a third layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resourced between UE and network. A mobile station and an eNode B may be able to exchange RRC messages with each other via radio communication layer and RRC layers.

Figure 2:
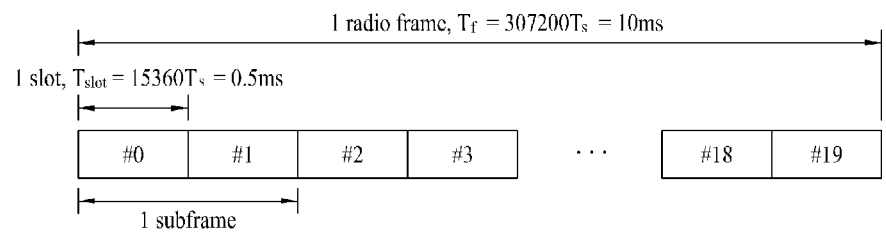
FIG. 2 is a diagram for one example of a structure of a radio frame used in 3GPP LTE system as one example of a mobile communication system.

FIG. 2 is a diagram for one example of a structure of a radio frame used in 3GPP LTE system as one example of a mobile communication system.

Referring to FIG. 2, one radio frame has a length of 10 ms (327,200·$T_s$) and is constructed with 10 subframes in equal size. Each of the subframes has a length of 1 ms and is constructed with two slots. Each of the slots has a length of 0.5 ms (15,360·$T_s$). In this case, $T_s$ indicates a sampling time and is expressed as $T_s=1/(15\ kHz\times 2,048)=3.2552\times 10^{-8}$ (about 33 ns). The slot includes a plurality of OFDM symbols or SC-FDMA symbols in a time domain and also includes a plurality of resource blocks (RBs) in a frequency domain.

In the LTE system, one resource block (RB) includes '12 subcarriers×7 or 6 OFDM or SC-FDMA (single carrier-frequency division multiple access) symbols'. A transmission time interval (hereinafter abbreviated TTI), which is a unit time for transmitting data, can be determined by at least one subframe unit. The above-described structure of the radio frame is just exemplary. And, the number of subframes included in a radio frame, the number of slots included in a subframe and/or the number of OFDM or SC-FDMA symbols included in a slot may be modified in various ways.

Figure 3:
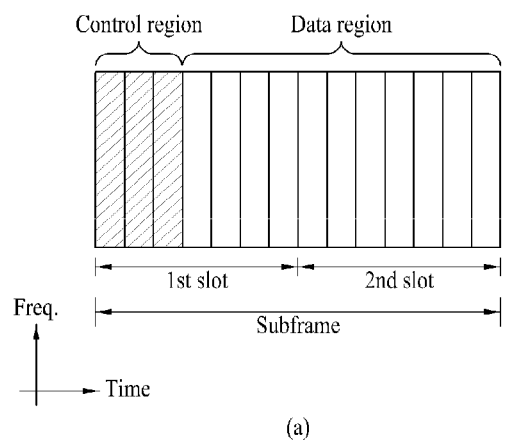
FIG. 3 is a diagram for structures of downlink and uplink subframes in 3GPP LTE system as one example of a mobile communication system.
Figure 3:
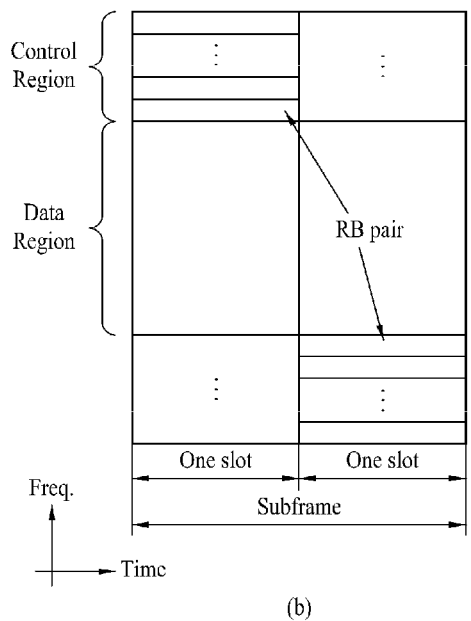

FIG. 3 is a diagram for structures of downlink and uplink subframe in 3GPP LTE system as one example of a mobile communication system.

Referring to FIG. 3 (a), one downlink (hereinafter abbreviated DL) subframe includes 2 slots in a time domain. Maximum 3 fore OFDM symbols of the first slot within the DL subframe correspond to a control region for allocating control channels thereto and the rest of the OFDM symbols correspond to a data zone for allocating PDSCH (physical downlink shared channel) thereto.

DL (downlink) control channels used in 3GPP LTE system or the like include PCFICH (physical control format indicator channel), PDCCH (physical downlink control channel), PHICH (physical hybrid-ARQ indicator channel), etc. The PCFICH carried on a first OFDM symbol carries the information on the number of OFDM symbols (i.e., a size of a control region) used for the transmission of control channels within a subframe. The control information carried on the PDCCH is called downlink control information (hereinafter abbreviated DCI). The DCI indicates a UL resource allocation information, a DL resource allocation information, a UL transmission power control command for random mobile station groups and the like. The PHICH carries ACK/NACK (acknowledgement/not-acknowledgement) signal for UL HARQ (hybrid automatic repeat request). In particular, the ACK/NACK signal for UL data transmitted by a mobile station is carried on PHICH.

In the following description, PDCCH of DL physical channel is explained.

First of all, an eNode B is able to transmit resource allocation and transmission format (this is so-called DL grant) of PDSCH, resource allocation information (this is so-called UL grant) of a physical UL shared channel, an aggregation of transmission power control commands for a random mobile station and individual mobile stations in a group, activation of VoIP (voice over internet protocol) and the like via PDCCH. A plurality of PDCCHs may be transmitted within a control region and a mobile station may be able to monitor a plurality of the PDCCHs. The PDCCH is constructed with aggregation of one or several contiguous CCEs (control channel elements). The PDCCH constructed with the aggregation of one or several CCEs may be transmitted via the control region after completion of sub-block interleaving. The CCE is a logical allocation unit used to provide the PDCCH with a coding rate in accordance with a status of a radio channel. The CCE corresponds to a plurality of resource element groups. The format of the PDCCH and the bit number of available PDCCH are determined in accordance with the correlation between the number of CCEs and the coding rate provided by the CCEs.

The control information carried on the PDCCH may be called DL control information (hereinafter abbreviated DCI). Table 1 shows the DCI according to DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |

TABLE 1-continued

| DCI Format | Description |
| --- | --- |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates UL resource allocation information, DCI format 1~2 indicates DL resource allocation information, and DCI format 3 or 3A indicates a transmission power control (hereinafter abbreviated TPC) command for random UE groups.

DCI format 3/3A includes TPC commands for a plurality of mobile stations. In case of DCI format 3/3A, an eNode B masks CRC with TPC-ID. In this case, the TPC-ID is a demasking identifier for a mobile station to monitor PDCCH that carries the TPC command. In particular, the TPC-ID may be the identifier used by a mobile station to decode PDCCH in order to check whether TPC command is transmitted on PDCCH. The TPC-ID may be defined in a manner of reusing such a previous identifier as C-RNTI (C-radio network temporary identifier), PI-RNTI, SC-RNTI, and RA-RNTI or may be defined as a new identifier. The TPC-ID is an identifier for mobile stations of a specific set in a cell, which differs from the C-RNTI as is an identifier for a specific mobile station or the PI-RNTI, the SC-RNTI or the RA-RNTI as an identifier for all mobile stations in a cell. In case that DCI includes TPC commands for N mobile stations, it may be enough for the N mobile stations to receive the TPC commands. If TPC commands for all mobile stations in a cell are included in DCI, TPC-ID may become an identifier for all the mobile stations in the cell.

A mobile station finds TPC-ID by monitoring an aggregation of PDCCH candidates in a search space within a subframe. In doing so, the TPC-ID may be found in a common search space or a UE-specific (user equipment-specific) search space. The common search space may mean a search space searched by all mobile stations in a cell. And, the UE-specific search space may mean a search space searched by a specific user equipment (UE) or mobile station. When TPC-ID is demasked from a corresponding PDCCH candidate, if CRC error is not detected, a mobile station may be able to receive a TPC command on PDCCH.

TPC-ID, which is an identifier for PDCCH carrying a plurality of TPC commands only, is defied. If the TPC-ID is detected, a mobile station receives a TPC command on a corresponding PDCCH. In this case, the TPC command is used to adjust a transmission power of a UL channel. Therefore, it may be able to prevent a failure of transmission to an eNode B or an interference with another mobile station due to a wrong power control.

A scheme for an eNode B to map a resource for PDCCH transmission in LTE system or the like is schematically described as follows.

Generally, an eNode B may be able to transmit scheduling allocation information and other control informations via PDCCH. A physical control channel may be transmitted as one aggregation or a plurality of contiguous control channel elements (CCEs). In this case, one control channel element (hereinafter abbreviated CCE) includes 9 resource element groups (REGs). The number of REGs failing to be allocated to PCFICH (physical control format indicator channel) or PHICH (physical hybrid automatic repeat request indicator channel) is $N_{REG}$. The number of CCEs available for a system ranges 0 to '$N_{CCE}-1$', where $N_{CCE}=\lfloor N_{REG}/9 \rfloor$. The PDCCH supports such a multiple format as shown in Table 2. One PDCCH including n contiguous CCEs starts with a CCE that executes 'i mod n=0', where 'i' is a CCE number. Multiple PDCCHs may be transmitted in one subframe.

TABLE 2

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, an eNode B is able to determine a PDCCH format in accordance with how many regions will receive control information and the like. And, a mobile station is able to reduce overhead by reading the control information and the like by CCE unit.

Referring to FIG. 3 (b), a UL subframe can be divided into a control region and a data region in a frequency domain. The control region is allocated to a physical UL control channel (PUCCH) carrying UL control information. And, the data region is allocated to a physical UL shared channel (PUSCH) for carrying user data. In order to maintain the single charier property, one mobile station does not transmit PUCCH and PUSCH simultaneously. PUCCH for one mobile station is allocated as an RB pair in one subframe. RBs belonging to the RB pair occupy different subcarriers in two slots, respectively. And, frequency hopping is performed on the RB pair allocated to the PUCCH on a slot boundary.

Figure 4:
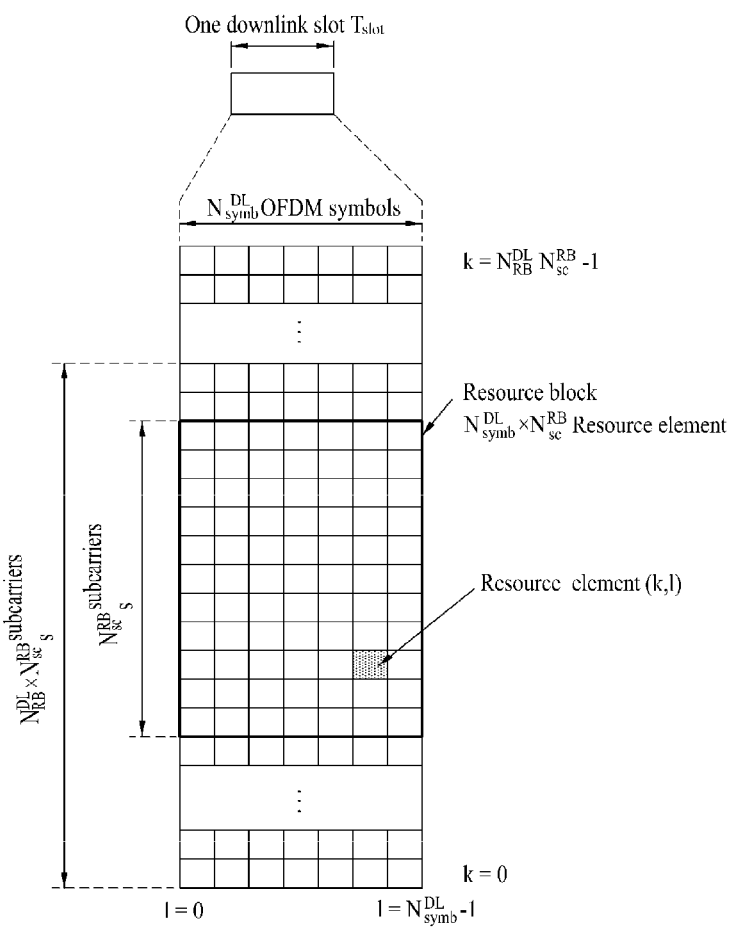
FIG. 4 is a diagram of a downlink (DL) time-frequency resource grid structure in 3GPP LTE system.

FIG. 4 is a diagram of a downlink time-frequency resource grid structure used by the present invention.

A DL signal transmitted in each slot uses a resource grid structure constructed with $N^{DL}_{RB} * N^{RB}_{SC}$ subcarriers and $N^{DL}_{symb}$ OFDM (Orthogonal Frequency Division Multiplexing) symbols. In this case, '$N^{DL}_{RB}$' indicates the number of resource blocks (RBs) in DL, '$N^{RB}_{SC}$' indicates the number of subcarriers constructing one RB, and '$N^{DL}_{symb}$' indicates the number of OFDM symbols in one DL slot. A size of '$N^{DL}_{RB}$' varies in accordance with a DL transmission bandwidth configured within a cell and should meet '$N^{min,DL}_{RB} \leq N^{DL}_{RB} \leq N^{max,DL}_{RB}$'. In this case, '$N^{min,DL}_{RB}$' is a smallest DL bandwidth supported by a wireless communication system and '$N^{max,DL}_{RB}$' is a greatest DL bandwidth supported by the wireless communication system. It may become '$N^{min,DL}_{RB}=6$' and '$N^{max,DL}_{RB}=110$', by which the present example is non-limited. The number of the OFDM symbols included in one slot can vary in accordance with a length of a CP (cyclic prefix) and an interval of subcarrier. In caser of multi-antennal transmission, one resource grid can be defined for each antenna port.

Each element within the resource grid for each antenna port is called a resource element (hereinafter abbreviated RE) and is uniquely identified by an index pair (k, l) within a slot. In this case, 'k' is an index in a frequency domain and 'l' is an index in a time domain. The 'k' has a value selected from '0, . . . , $N^{DL}_{RB} N^{RB}_{SC} -1$' and the 'l' has a value selected from '0, . . . , $N^{DL}_{symb}-1$'.

The resource block shown in FIG. 4 is used to describe the mapping relation between a prescribed physical channel and resource elements. Resource blocks can be classified into physical resource blocks (PRBs) and virtual resource blocks (VRBs). One PRB can be defined by $N^{DL}_{symb}$ contiguous OFDM symbols in time domain and $N^{RB}_{SC}$ contiguous subcarriers in frequency domain. In this case, '$N^{DL}_{symb}$' and '$N^{RB}_{SC}$' can be given as shown in Table 3. Hence, one PRB is constructed with '$N^{DL}_{symb} \times N^{RB}_{SC}$' SC resource elements. One PRB corresponds to one slot in time domain and also corresponds to 180 kHz in frequency domain, by which the present example is non-limited.

TABLE 3

| Configuration | | $N_{SC}^{RB}$ | $N_{symb}^{DL}$ |
|---|---|---|---|
| Normal cyclic prefix | Δf = 15 kH | 12 | 7 |
| Extended cyclic prefix | Δf = 15 kH | | 6 |
| | Δf = 7.5 kH | 24 | 3 |

PRB has a value ranging 0 to '$N^{DL}_{RB}-1$' in frequency domain. The relation between the PRB number ($n_{PRB}$) in frequency domain and the resource element (k, l) in one slot satisfies $$n_{PRB} = \left\lfloor \frac{k}{N_{SC}^{RB}} \right\rfloor.$$

In this case, a size of the VRB is equal to that of PRB. The VRB can be defined in a manner of being categorized into a localized VRB (hereinafter abbreviated LVRB) and a distributed VRB (hereinafter abbreviated DVRB). For the VRB of each type, a single VRB number '$n_{VRB}$' is assigned to a pair of VRBs in two slots within one subframe.

The VRB may have a size equal to that of the PRB. VRBs of two types may be defined as follows. First of all, the first type is the localized VRB (LVRB). And, the second type is the distributed VRB (DVRB). For the VRB of each of the types, a pair of VRBs are assigned across two slots of one subframe with a single VRB index (hereinafter named a VRB number). In particular, one index selected from the group consisting of 0 to '$N^{DL}_{RB}-1$' is assigned to $N^{DL}_{RB}$ VRBs belonging to a first one of the two slots constructing one subframe. And, one index selected from the group consisting of 0 to '$N^{DL}_{RB}-1$' is assigned to $N^{DL}_{RB}$ VRBs belonging to a second one of the two slots constructing one subframe as well.

In the following description, a process for an eNode B to send PDCCH to a mobile station in downlink is explained.

First of all, an eNode B determines a PDCCH format in accordance with a DCI (downlink control information) which is to be sent to a mobile station and then attaches a CRC (cyclic redundancy check) to a control information. In this case, the CRC is masked with a unique identifier, which will be called a radio network temporary identifier (hereinafter abbreviated RNTI), in accordance with an owner or usage of PDCCH. If the PDCCH is provided for a specific mobile station, the CRC can be masked with a unique identifier of a mobile station, e.g., C-RNTI (cell-RNTI). If the PDCCH is provided to a paging message, the CRC can be masked with a paging indication identifier, e.g., P-RNTI (paging-RNTI). If the PDCCH is provided for a system information, the CRC can be masked with a system information identifier, e.g., SI-RNTI (system information-RNTI). In order to indicate a random access response which is the response to a transmission of a random access preamble of a mobile station, the CRC can be masked with RA-RNTI (random access-RNTI). Table 4 shows examples of an identifier with which PDCCH is masked.

TABLE 4

| Type | Identifier | Description |
| --- | --- | --- |
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If C-RNTI is used, PDCCH carries a control information for a corresponding specific mobile station. If a different RNTI is used, PDCCH carries a shared control information received by all or a plurality of mobile stations within a cell. The eNode B generates a coded data by performing a channel coding on the CRC attached DCI. The bas station then performs a rate matching according to the number of CCEs allocated to the PDCCH format. subsequently, the eNode B generates modulated symbols by modulating the coded data. Thereafter, the eNode B maps the modulated symbols to the physical resource elements.

Figure 5:
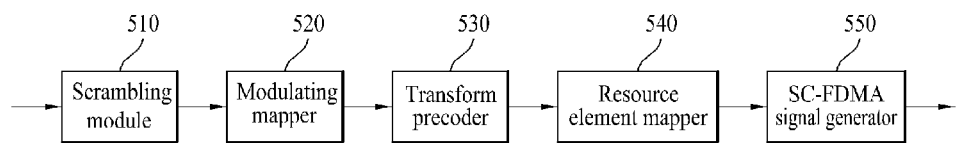
FIG. 5 is a diagram for describing a signal processing process for a mobile station to transmit an uplink (UL) signal.

FIG. 5 is a diagram for describing a signal processing process for a mobile station to transmit a UL signal.

Referring to FIG. 5, in order to transmit a UL signal, a scrambling module 510 of a mobile station may be able to scramble a transmission signal using MS-specific (mobile station-specific) scrambling signal. This scrambled signal is inputted to a modulating mapper 520 and is then modulated into a complex symbol by BPSK (binary phase shift keying), QPSK (quadrature phase shift keying) or 16 QAM (quadrature amplitude modulation) in accordance with a type and/or channel state of the transmission signal. Subsequently, the complex symbol is processed by a transform precoder 530 and is then inputted to a resource element mapper 540. In this case, the resource element mapper 540 may be able to map the complex symbol into a time-frequency resource element that will be actually used for a transmission. This processed signal is inputted to an SC-FDMA signal generator 550 and may be then transmitted to an eNode B via antenna.

Figure 6:
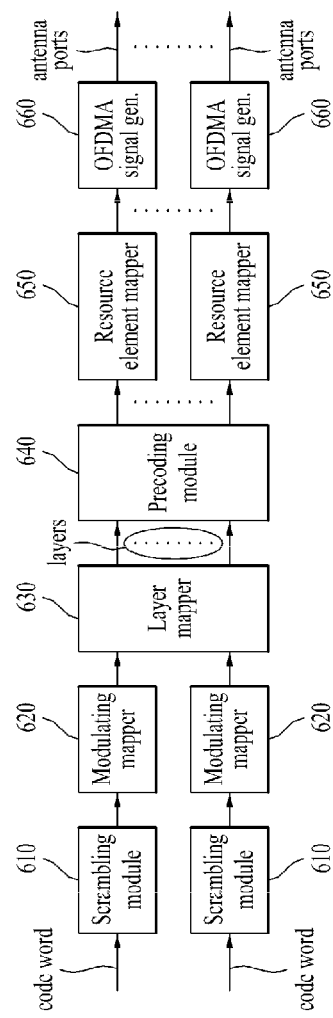
FIG. 6 is a diagram for describing a signal processing process for an eNode B to transmit a DL signal.

FIG. 6 is a diagram for describing a signal processing process for an eNode B to transmit a DL signal.

Referring to FIG. 6, in 3GPP LTE system, an eNode B may be able to transmit at least one codeword in DL. Hence, each of the at least one codeword can be processed into a complex symbol by a scrambling module 610 and a modulating mapper 602 like the uplink shown in FIG. 2. The complex symbol may be then mapped to a plurality of layers by a layer mapper 603. Each of a plurality of the layers may be then assigned to each transmitting antenna by being multiplied by a prescribed precoding matrix selected by a precoding module 604 in accordance with a channel state. A per-antenna transmission signal processed in the above manner is mapped to a time-frequency resource element, which will be used for a transmission, by each resource element mapper 605, enters an OFDM (orthogonal frequency division multiple access) signal generator 606, and may be then transmitted via a corresponding antenna.

If a mobile station in a wireless communication system transmits a signal in UL, it may cause a problem of PAPR (peak-to-average ratio) more serious than a case for an eNode B to transmit a signal in DL. Unlike the OFDMA scheme used for a DL signal transmission, as mentioned with reference to FIG. 5 and FIG. 6, a UL signal transmission may use SC-FDMA (single carrier-frequency division multiple access) scheme. In 3GPP LTE ($3^{rd}$ partnership project long-term evolution) system, SC-FDMA (single carrier-frequency division multiple access) has been adopted. If SC-FDMA is adopted, it is advantageous in maintaining property of low PAPR (peak to average power ratio) or CM (cubic metric).

Figure 7:
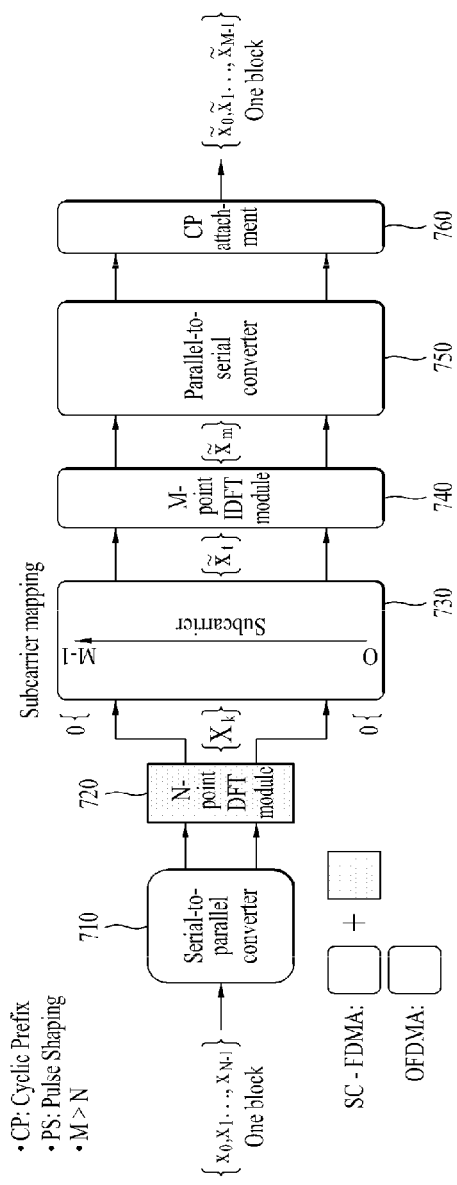
FIG. 7 is a diagram for describing SC-FDAM scheme and OFDMA scheme.

FIG. 7 is a diagram for describing SC-FDAM scheme and OFDMA scheme.

First of all, 3GPP system adopts OFDMA in DL and SC-FDMA in UL. Referring to FIG. 7, a mobile station for a UL signal transmission and an eNode B for a DL signal transmission are identical to each other in including a serial-to-parallel converter 710, a subcarrier mapper 730, an M-point IDFT module 740 and a CP (cyclic prefix) adding module 760. However, a mobile station for transmitting a signal by SC-FDMA scheme may additionally include an N-point DFT module 720. And, the N-point DFT module 720 may enable a transmission signal to have a single carrier property by canceling out an IDFT processing effect of the M-point IDFT module 740.

Figure 8A:
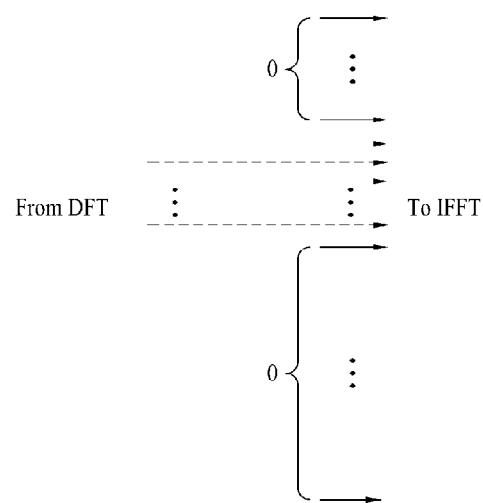
FIG. 8 (a) and FIG. 8 (b) are diagrams for describing a signal mapping scheme in frequency domain to meet a single carrier property in the frequency domain.
Figure 8B:
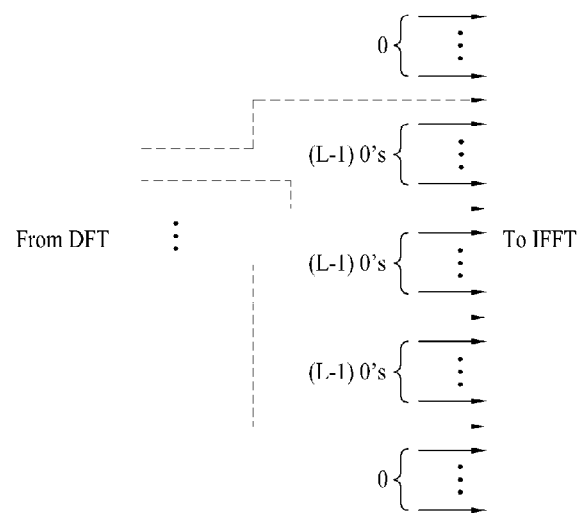

FIG. 8a and FIG. 8b are diagrams for describing a signal mapping scheme in frequency domain to meet a single carrier property in the frequency domain.

FIG. 8a shows a localized mapping scheme, while FIG. 8(b) shows a distributed mapping scheme.

In the following description, clustered SC-FDMA will be described as a modified form of SC-FDMA. First of all, the clustered SC-FDMA divides DFT process output samples in a subcarrier mapping procedure into subgroups and discontinuously maps the subgroups to frequency regions (or subcarrier regions), respectively.

Figure 9:
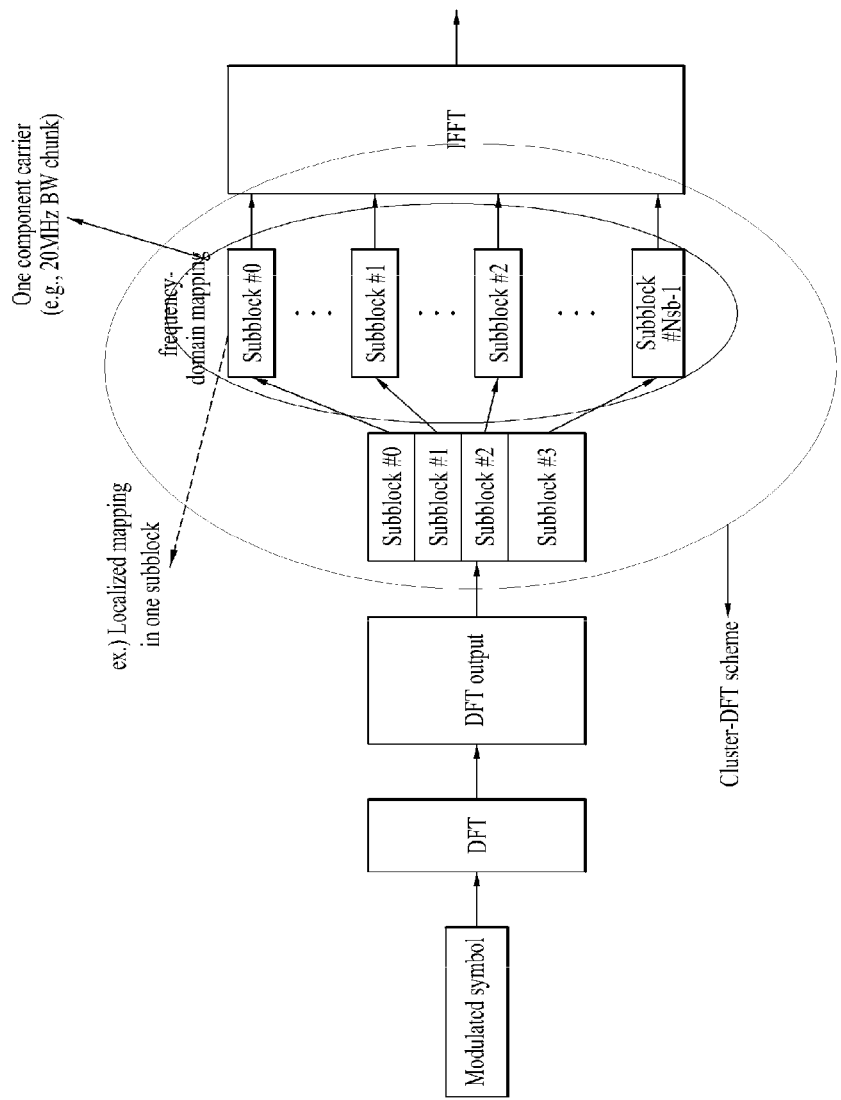
FIG. 9 is a diagram of a signal processing process for mapping DFT process output samples to a single carrier in clustered SC-FDMA.

FIG. 9 is a diagram of a signal processing process for mapping DFT process output samples to a single carrier in the clustered SC-FDMA.

Figure 10A:
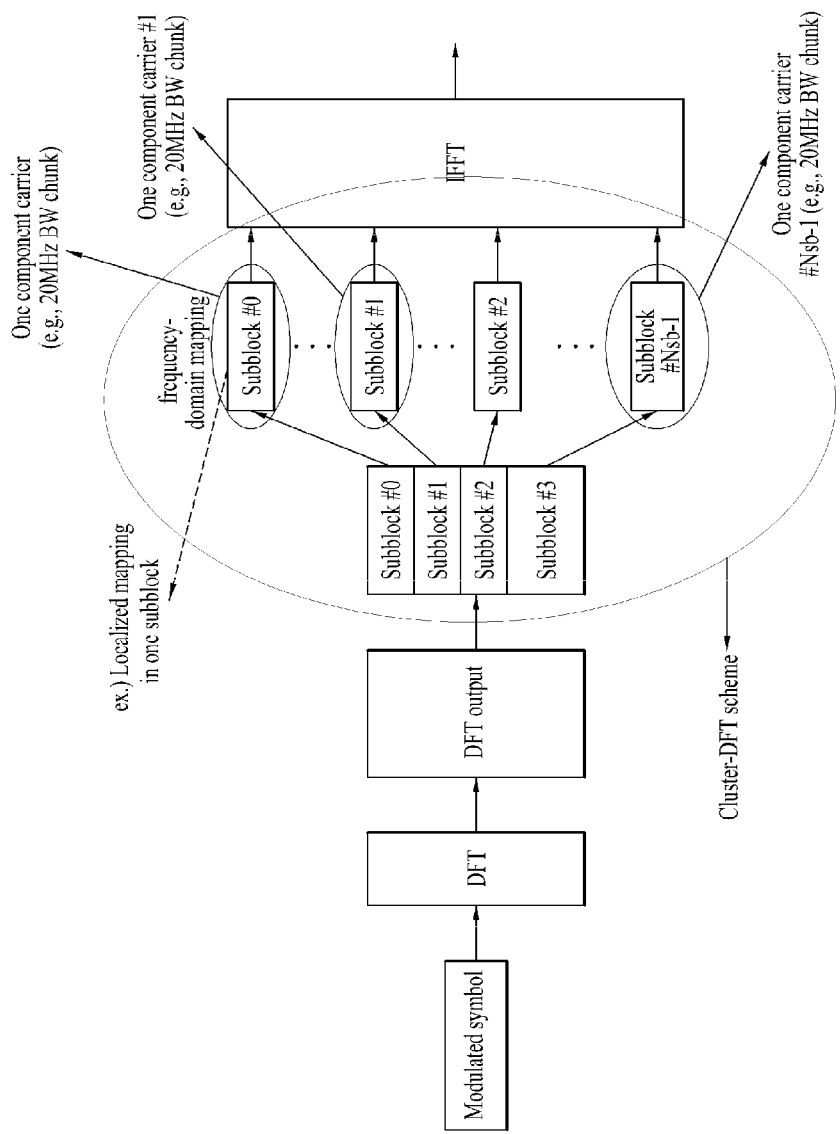
FIG. 10 (a) and FIG. 10 (b) are diagrams of a signal processing process for mapping DFT process output samples to multicarrier in clustered SC-FDMA.
Figure 10B:
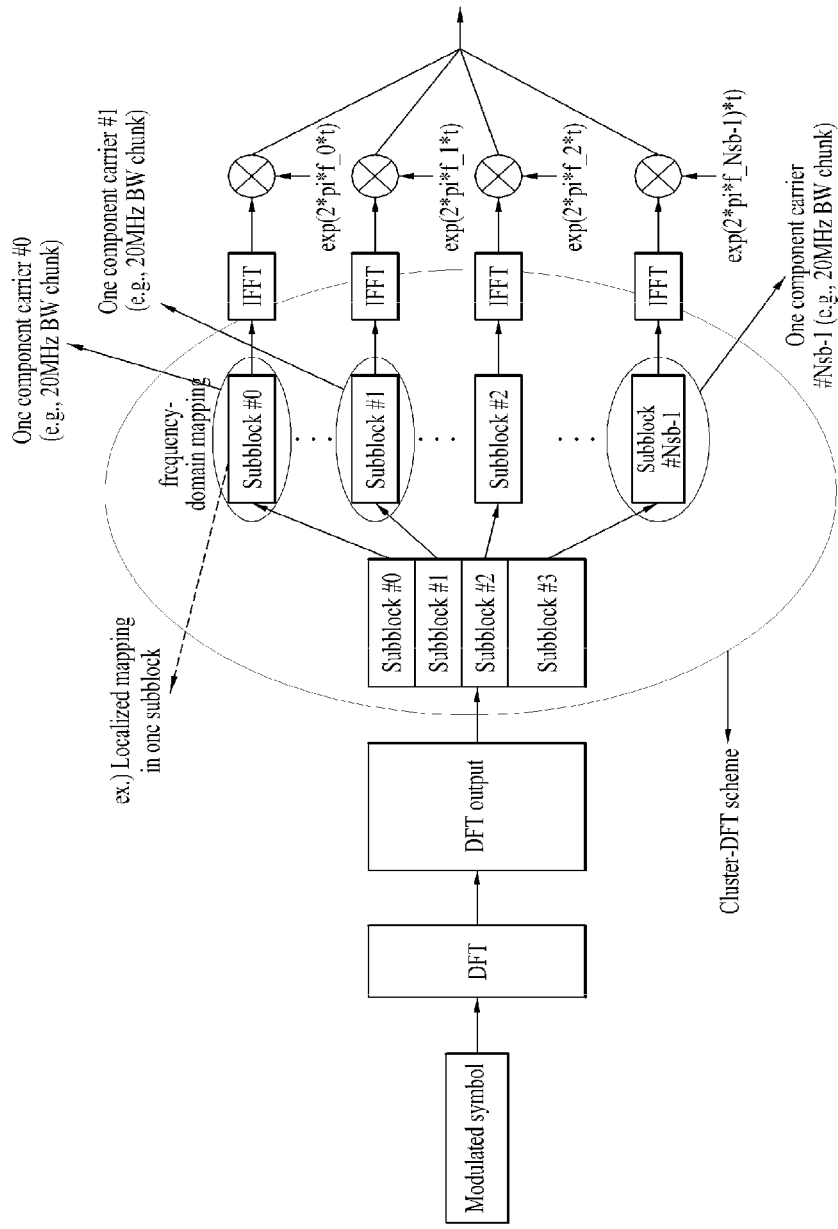

FIG. 10a and FIG. 10b are diagrams of a signal processing procedure for mapping DFT process output samples to multicarrier in the clustered SC-FDMA.

In particular, FIG. 9 shows an example of applying the clustered SC-FDMA in an intra-carrier, and FIG. 10a and FIG. 10b show examples of applying inter-carrier clustered SC-FDMA. Moreover, FIG. 10a shows a case of generating a signal via a single IFFT block if a subcarrier spacing between component carriers contiguous to each other is aligned in a situation that component carriers contiguous to each other are allocated in a frequency domain. And, FIG. 10b shows a case of generating a signal via a plurality of IFFT blocks because component carriers are not contiguous to each other in a situation that component carriers are non-contiguously allocated in a frequency domain.

Figure 11:
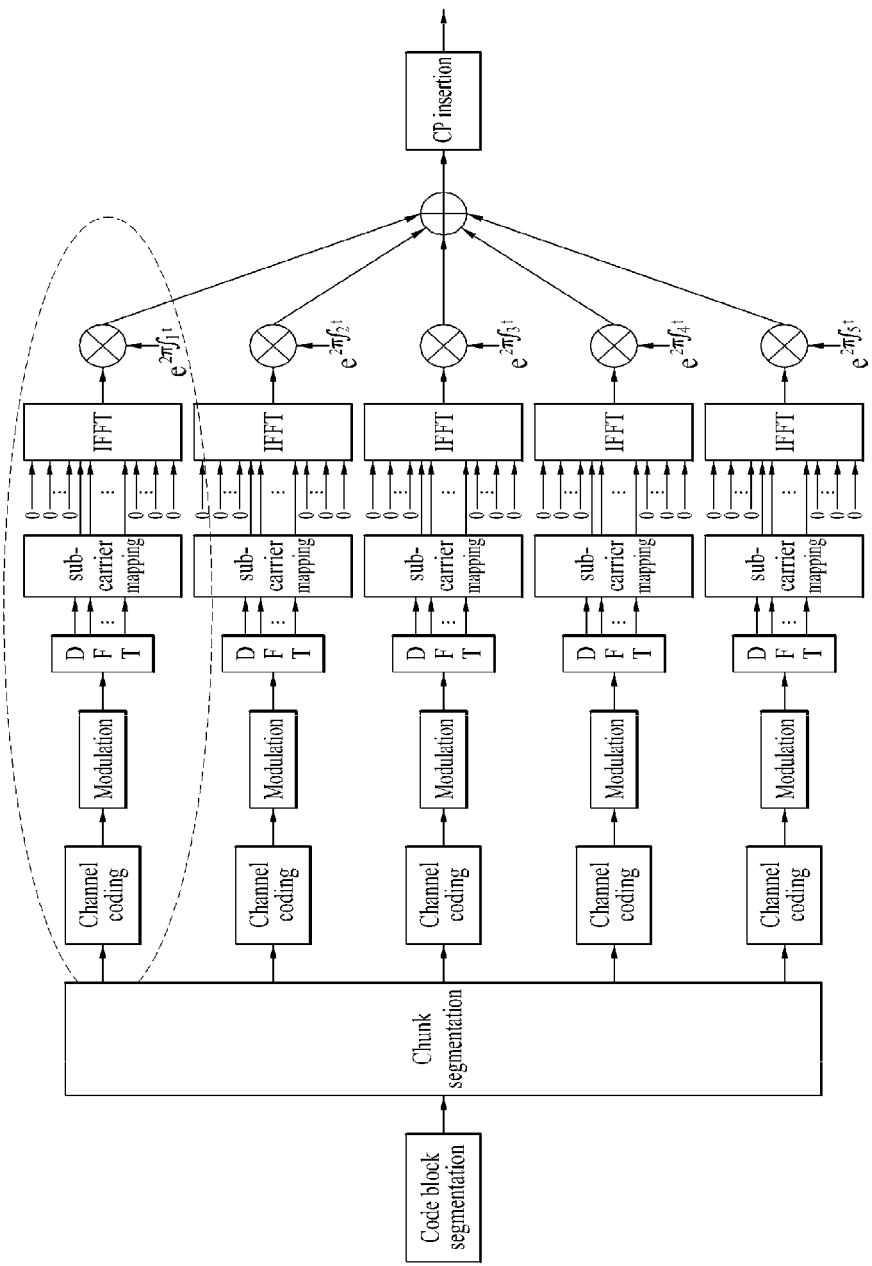
FIG. 11 is a diagram of a signal processing process in segmented SC-FDMA.

FIG. 11 is a diagram of a signal processing process in the segmented SC-FDMA.

When IFFTs, of which number is equal to the prescribed number of DFTs, are applied, as a configuration of a relation between the DFTs and the IFFTs is in a one-to-one correspondence, the segmented SC-FDMA may be represented as N×SC-FDMA or N×DFT-s-OFDMA because of simply extending DFT spreading of previous SC-FDMA and frequency subcarrier mapping configuration of IFFT. In this specification, the N×SC-FDMA or N×DFT-s-OFDMA is named segmented SC-FDMA. Referring to FIG. 11, the segmented SC-FDMA performs a DFT process by a group unit to mitigate single carrier property condition in a manner of grouping all time-domain modulated symbols into N groups (where, N is an integer greater than 1).

In the following description, PUCCH format defined in LTE Release-8 and a UL transmission power of a mobile station are explained. First of all, PUCCH is a UL control channel that carries UL control information. In LTE system, a mobile station is unable to transmit PUCCH and PUSCH simultaneously due to the single carrier property. However, as multicarrier is introduced into LTE-A system, a mobile station is able to transmit PUCCH on a specific component carrier (e.g., a primary component carrier or PCell) together with PUSCH. In particular, PUCCH supports multiple formats and PUCCH formats supported by LTE Release-8 are shown in Table 5. In Tale 5, PUCCH format 2a/2b supports normal CP only.

TABLE 5

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Formula 1 represents a UL power for UL control channel transmission of a mobile station as a unit of dBm in LTE Release-8.

$$P_{PUCCH}(i) = \min\{P_{CMAX}, P_{0\_PUCCH} + PL + h(n_{CQI}, n_{HARQ}) + \Delta_{F\_PUCCH}(F) + g(i)\} \quad \text{[Formula 1]}$$

In Formula 1, the i indicates a subframe index. The $P_{CMAX}$ indicates a maximum transmittable power of a mobile station. The $P_{O\_PUCCH}$ indicates a parameter configured with a sum of cell-specific parameters and is notified by an eNode B via higher layer signaling. The PL indicates a estimate of a DL path loss (or signal loss) calculated by a mobile station in a unit of dB and is represented as 'PL= referenceSignalPower—higher layer filtered RSRP'. The h(n) is a value that varies in accordance with PUCCH format. The $n_{CQI}$ indicates number information bit(s) for channel quality information (CQI). The indicates the number of HARQ bit(s). The $\Delta_{F\_PUCCH}(F)$ is a value relative to PUCCH format 1a, corresponds to PUCCH format (F), and is notified by an eNode B via higher layer signaling. The g(i) indicates a current PUCCH power control adjustment state of a subframe of an index i. The $h(n_{CQI}, n_{HARQ})$ is 0 in PUCCH format 1/1a/1b. The $h(n_{CQI}, n_{HARQ})$ may be represented as Formula 2 in PUCCH format 2/2a/2b in case of normal CP (Cyclic Prefix).

$$h(n_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases} \quad \text{[Formula 2]}$$

Table 6 show $\delta_{PUCCH}$ values mapped to TPC command field in DCI format 1A/1B/1D/1/2A/2/3. And, Table 7 shows $\delta_{PUCCH}$ values mapped to TPC command field in DCI format 3A. In this case, the $\delta_{PUCCH}$ indicates a correction value (or a power correction value) specific to each mobile station.

TABLE 6

| TPC Command Field in DCI format 1A/1B/1D/1/2A/2/3 | $\delta_{PUCCH}$ [dB] |
|---|---|
| 0 | −1 |
| 1 | 0 |
| 2 | 1 |
| 3 | 3 |

TABLE 7

| TPC Command Field in DCI format 3A | $\delta_{PUCCH}$ [dB] |
|---|---|
| 0 | −1 |
| 1 | 1 |

Transmission diversity schemes may be mainly classified into two kinds of types including 1-resource based transmission diversity schemes and 2-resource based transmission diversity schemes.

In the following description, types and contents of the 1-resource based transmission diversity (TxD) schemes are schematically explained.

1. Small Delay CDD (Cyclic Delay Diversity)

This relates to a single carrier and is advantageous in having low CM property. In order to a diversity gain sufficient for CDD, a delay value having at least one cyclic phase rotation sequence. Actually, 2 resources are required.

2. Slot Level PVS (Precoding Vector Switching) (or, TSRD (Time Switched Transmit Diversity))

This relates to a single carrier and is advantageous in having low CM property. However, a diversity gain may be restricted.

In the following description, types and contents of the 2-resource based transit diversity (TxD) schemes are schematically explained.

1. SC-SFBC (Single Carrier-Space Frequency Block Code) Scheme

SC-SFBC scheme relates to a single carrier and is advantageous in having low CM property. If the SC-SFBC scheme is adopted, a diversity gain becomes larger than that in case of the SC-SFBC scheme being not adopted, however, orthogonality between mobile stations may be damaged. For instance, a signal from an antenna 1 of a mobile station 0 and a signal from an antenna 0 of a mobile station 1 are not orthogonal to each other. Hence, backward compatibility of LTE release-8 is not satisfied. And, a resource allocated to each antenna is limited to the same physical resource block (PRB).

2. STBC (Space Time Block Code)-Scheme

Like the SC-SFBC scheme, this scheme relates to a single carrier and is advantageous in having low CM property. In PUCCH format 1, a diversity gain becomes larger than that in case of the SC-SFBC scheme being not adopted, however, orthogonality between mobile stations may be damaged. In case of a puncturing format for transmission of a sounding reference signal (SRS) in a second slot of a specific subframe, it may cause a problem that some symbols are unpaired.

In PUCCH format 2, a diversity gain becomes larger than that in case of the SC-SFBC scheme being not adopted, however, orthogonality between mobile stations may be damaged. And, it may cause a problem that last OFDM symbol is unpaired in one slot of each specific subframe. A resource allocated for each antenna is limited to the same physical resource block (PRB).

3. FSTD (Frequency Switched Transmit Diversity) Scheme

In case of using a CG (Computer Generated) sequence having a length 12, a high CM transmission is able to be performed. In case of using a ZC (Zadoff-Chu) sequence having a length 6, a low CM transmission is able to be performed. However, the FSTD scheme may not be suitable for PUCCH transmission.

4. ORT (Orthogonal Resource Transmission) Scheme

This scheme relates to a single carrier and is advantageous in having low CM property. This scheme is usable for both PUCCH format 1 and PUCCH format 2. The scheme enables a large diversity gain and maintains orthogonality between mobile stations. Hence, backward compatibility of LTE release-8 is satisfied.

Figure 12:
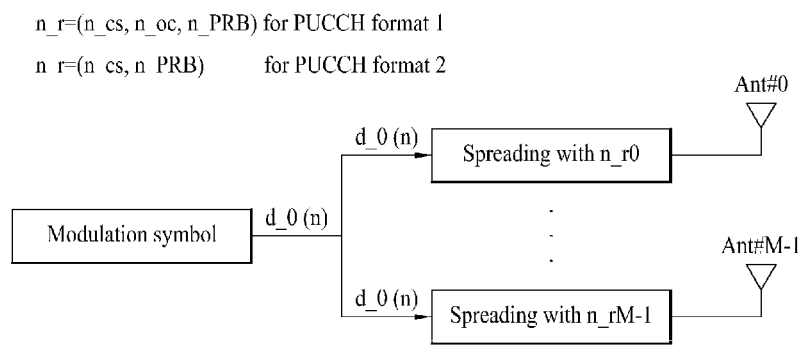
FIG. 12 is a diagram to describe orthogonal resource transmission (ORT).

FIG. 12 is a diagram to describe orthogonal resource transmission (ORT).

Referring to FIG. 12, a modulated symbol is copied into each antenna port for a spreading operation. A signal is transmitted by space-resource orthogonal scheme. As signals are transmitted on different channels via different resources, it may be able to obtain a full spatial diversity gain. In the following description, ORT means spatial orthogonal resource transmit diversity (SORTD) unless mentioned specially.

In FIG. 12, $d\_0(n)$ is increased as many as the number M of transmission antennas of a mobile station. For instance, if there is one transmission antenna, the $d\_0(n)$ uses one resource. If there are 2 transmission antennas, the $d\_0(n)$ uses 2 resources and the same symbol $d\_0(n)$ may exist in each of the resources. This may be applicable to fit for the number of antennas. In the description of the present invention, the number of transmission antennas used for PUCCH transmission of a mobile station is set to 2, for example.

Referring to FIG. 12, if a mobile station transmits a UL control channel (e.g., PUCCH) via 2 Tx antennas (i.e., 2 transmitting antennas), a full spatial diversity gain is obtained, whereby reception performance of a control channel (e.g., PUCCH format 1/2 in LTE-LTE-A system) can be enhanced. However, a transmission scheme may be switched to 1-Tx transmission scheme from 2-Tx transmission scheme statically/semi-statically/dynamically depending on the circumstances. In doing so, if a transmission mode of a mobile station is switched to 1-Tx transmission scheme from 2-Tx transmission scheme, reception performance of an eNode may be relatively lowered. In every case of changing the transmission scheme having more Tx antennas into the transmission scheme having less Tx antennas as well as the case of switching the 2-Tx transmission to 1-Tx transmission, reception performance of an eNode B is relatively lowered.

However, an eNode B should maintain a received signal strength at the same level regardless of a transmission scheme type used by a mobile station. Nevertheless, if a transmission mode of a mobile station is dynamically changed, reception performance of an eNode B becomes seriously degraded.

A case of dynamically changing a transmission mode of a mobile station is described by taking an example as follows. First of all, in LTE Release-8 system, a mobile station should feedback ACK/NACK signal to an eNode B in response to a signal transmitted by the eNode B. If the mobile station receives PUCCH including DL grant and PUSCH including data in a specific subframe, the mobile station may be able to feed back ACK/NACK signal, which is an ACK/NACK feedback in response to the corresponding PUSCH reception, to the eNode B via PUCCH resource corresponding to a lowest CCE index of the DL grant in the specific subframe.

Assume that a mobile station performs a transmission by spatial orthogonal resource transmit diversity (SORTD) and that 2 Tx antennas are configured. If the mobile station succeeds in decoding a DL grant received from an eNode B in a specific subframe into 2, 4 and 8 CCE aggregation levels (i.e., L=2, 4, 8), a first orthogonal resource for the first Tx antenna and a second orthogonal resource for the second Tx antenna may be set to correspond to a lowest CCE index (n_CCE) and a CCE index (n_CCE+1), respectively.

On the other hand, if the mobile station succeeds in decoding the DL grant into 1 CCE aggregation level (i.e., L=1), it may be able to operate in a single antenna port mode using the lowest CCE index n_CCE. In this case, the single antenna mode may mean a mode that a mobile station transmits a signal via 1 Tx antenna physically. Alternatively, the signal antenna mode may mean a scheme that a signal is received by a receiving end using antenna virtualization such as PVS/CDD (precoding vector switching/cyclic delay diversity) and the like in a manner of being recognized by the receiving end as if transmitted via 1 Tx antenna.

If a transmission mode in accordance with a variation of the number of Tx antennas of a mobile station which are able to transmit is dynamically changed at a subframe level, degradation of reception performance of an eNode B is inevitable. In other words, if a mobile station dynamically switches a transmission mode between a single antenna port transmission mode and a spatial orthogonal resource transmit diversity transmission mode, it may cause serious performance degradation to a signal reception performed by an eNode B. Since the spatial orthogonal resource transmit diversity transmission mode is superior to the single antenna port transmission mode, a PUCCH report, which is operating in the spatial orthogonal resource transmit diversity transmission mode, enters a fall-back state in the single antenna port transmission mode, a required SNR varies as well.

In order to solve the above problem, methods generally applicable to every case of changing a transmission mode of a mobile station are proposed in this specification. That is, if a switching is performed between a single antenna port transmission mode, a rank-1 precoding mode, a transmission diversity mode, an SU-MIMO (single user-MOMO) mode and an MU-MIMO (multi-user-MIMO) mode, methods for an eNode B to avoid degradation of reception performance are explained as follows.

First of all, in case of 2-Tx transmission of a mobile station, transmission power spectrum density (PSD) levels at antenna 0 and antenna 1 are equal to each other. In case of 2-Tx transmission, although a transmission PSD level per antenna is lower than that of a 1-Tx antenna, since the 2-Tx case is able to be expected an additional diversity gain, a received signal strength is high. Generally, on the assumption that a mobile station uses the same full power, if a transmission mode is switched to 2-Tx transmission from 1-Tx transmission, a gain of a signal received by an eNode B is increased by about 3 dB. In this case, in order to enable the eNode B to have the same signal reception performance in each of the 2-Tx transmission mode and the 1-Tx transmission mode, the mobile station may be able to adjust a transmission power value using an offset value. Alternatively, in order for the reception performance in the 2-Tx transmission mode to be better than that in the 1-Tx transmission mode, the mobile station may be able to adjust a transmission power value by applying an offset value. Meanwhile, if the 2-TX transmission mode is switched to the 1-Tx transmission mode, the mobile station may be able to use an offset value to maintain the same received signal strength of the case of operating in the 2-Tx transmission mode despite operating in the 1-Tx transmission mode. Specifically, in LTE-A UL system, when a mobile station performs a PUCCH transmission in a manner of switching between 1-Tx transmission mode and multi-Tx transmission mode statically/semi-statically/dynamically, it may be able to consider a method of maintaining a received signal strength of an eNode B by compensating for a value of transmission power for uplink.

In the following description, proposed are a method of defining an antenna configuration and a transmission mode in accordance with a transmission scheme of the antenna configuration and a method of solving a reception performance difference generated at an eNode B in the course of the transition of the transmission mode (e.g., transition between a single antenna port transmission mode and a transmit diversity mode). Regarding a transmission mode switching of a mobile station (i.e., a transmission mode switching in accordance with a change of the number transmission antennas), an eNode B sends a signaling about the mode switching to the mobile station, whereby the mobile station is then able to switch a transmission mode. Alternatively, as a transmission mode is defined per time unit (e.g., specific subframe, specific frame, etc.) in advance, a mobile station may be able to operate in the transmission mode defined by the corresponding time unit.

According to one embodiment of the present invention, as a mode of varying (increasing or decreasing) the number of available transmission antennas is entered, transmission power is compensated. For instance, a transmission power may compensate for an additional diversity gain expected in accordance with the decreasing number of the available transmitting antennas. In particular, if a transmission mode of a mobile station is switched to 1-Tx transmission mode from 2-Tx transmission mode, the mobile station may be able to use a power value, which is calculated by adding a power correction value (or a power compensation value or the like) by Formula 3, for PUCCH transmission power in the 1-Tx transmission mode.

$$PSD_{1\_Tx}=\text{calculated PSD based on Uplink power control equation}+\text{Offset} \quad \text{[Formula 3]}$$

In Formula 3, the $PSD_{1\_T}$ indicates a transmission power value to be used by a mobile station in a switched 1-Tx transmission mode and the offset value (Offset) corresponds to a power correction value at PSD level (or a calculated total power). The offset value is a power correction value previously defined by dB unit and can be used by the mobile station. If the previously defined offset value defined as one of a plurality of levels, an eNode B may be able to signal one offset value to the mobile station. Alternatively, the mobile station may be able to apply one of a plurality of the offset levels. Alternatively, the offset value may be set per PUCCH format. In this case, the offset value may be a different value for each of PUCCH format.

Referring to Formula 3, if the 2-Tx transmission mode is switched to the 1-Tx transmission mode, the processor 155 of the mobile station may be able to determine a UL control channel transmission power in a manner that a PSD level (or a calculated total power), which is calculated based on a UL power control formula, reflects an offset value in addition. In the description of the former example, the 2-Tx transmission mode is switched to the 1-Tx transmission mode. However, in case that a transmission via more antennas is changed into a transmission via less antennas, an offset value may be set differently in accordance with the number of the corresponding antennas. For another example, if the 1-Tx transmission mode is switched to the 2-Tx transmission mode, the processor 155 of the mobile station may be able to determine a transmission power value in the 2-Tx transmission mode by additionally applying an offset value to a PSD level (or a calculated total power) corresponding to the case of the 1-Tx transmission mode, as shown in Formula 3.

Formula 4 shows a UL power control formula applied to PUCCH transmission if a transmission mode of a mobile station is changed.

$$P_{PUCCH}(i)=\min\{P_{CMAX}, P_{0\_PUCCH}+PL+h(n_{CQI}, n_{HARQ})+\Delta_{F\_PUCCH}(F)+g(i)+\text{Offset}_{Tx\_mode}\} \quad \text{[Formula 4]}$$

In Formula 4, all parameters except the parameter $\text{Offset}_{TX\_mode}$ are identical to those shown in Formula 1. Although an offset value in accordance with a transmission mode can be explicitly shown like Formula 4, the offset value may be defined in a manner of being implicitly included in a previous power control parameter.

In Formula 4, the offset value in accordance with the transmission mode is an absolute value in the corresponding transmission mode rather than an accumulated value and may be applicable at a level equal or similar to the absolute value. Preferably, the offset value may be applicable in a manner of being added to a PSD level (or, a calculated total power) calculated in the previous 1-Tx transmission mode (i.e., the PUCCH power control based on Formula 1), which may not exclude that the offset value shown in Formula 4 is an accumulated value.

In this case, the parameter $\text{Offset}_{TX\_mode}$ may be defined per PUCCH format and may have a different value for each PUCCH format. In case that a transmission mode has been switched to a transmission mode using transmission antennas less than those of previous transmission mode, the offset value $\text{Offset}_{TX\_mode}$ may be set to a value varying in accordance with the changed number of the transmission antennas. For instance, a case of switching a 3-Tx transmission mode to a 1-Tx transmission mode may be set to an offset value $\text{Offset}_{TX\_mode}$ greater than that of a case of switching 2-Tx transmission mode to 1-Tx transmission mode in order to further compensate for the reception performance degradation of an eNode B. The offset value $\text{Offset}_{TX\_mode}$ in accordance with the transmission mode may be set per PUCCH format or the number of transmission antennas.

On the other hand, if 1-Tx transmission mode is switched to 2-Tx transmission mode, the processor of the mobile station may be able to determine a transmission power value by additionally applying the offset value $\text{Offset}_{TX\_mode}$ shown in Formula 4 to a PSD level (or a calculated total power). In doing so, the mobile station may be able to transmit a UL signal by spatial orthogonal resource transmit diversity (SORTD) scheme via 2 transmission antennas in the 2-Tx transmission mode. In this case, based on the reception performance of 1-Tx transmission mode, the offset value in case of 2-Tx transmission may be set to have the same level of the reception performance of 1-Tx transmission or may be set to further enhance reception performance of the eNode B in case of the 2-Tx transmission. Moreover, an offset value for each PUCCH format may be set to be transmitted in each transmission mode. In this case, the offset value may be set differently for each PUCCH format.

The offset value Offset$_{TX\_mode}$ corresponding to the power correction value may be notified to the mobile station by the eNode B via higher layer signaling or the like. Alternatively, the eNode B may be able to transmit the offset value Offset$_{TX\_mode}$ to the mobile station in a manner that the offset value Offset$_{TX\_mode}$ is included in a DL grant of the corresponding subframe. Alternatively, when the offset value Offset$_{TX\_mode}$ is shared by the eNode B and the mobile station by being previously defined in accordance with transmission mode and/or PUCCH format, the processor 155 of the mobile station may be able to determine a power value for a PUCCH transmission using the offset value Offset$_{TX\_mode}$ previously defined in accordance with the transmission mode and/or the PUCCH format.

A power control parameter for an eNode B to control a power of a mobile station is transmitted in a manner of being included in DCI transmitted in a power control message on PDCCH. In doing so, the mobile station may be able to interpret the corresponding value differently in accordance with a CCE aggregation level. In particular, assuming that the mobile station has received the PDCCH on 1 CCE, if a fallback is performed on a PUCCH transmission mode, when the eNode B receives a corresponding PUCCH, it may cause a problem that a bit error rate/quality of service (BER/QoS) is degraded. Thus, if the transmission mode of the mobile station is set dynamically, a predetermined offset value is added to the power control message or the power control message is multiplied by a scaling value.

The above-mentioned description may be extensibly applied to a multicarrier system adopted by LTE-A system. In particular, a mobile station may be able to determine PUCCH transmission power using an offset value (cf. Formula 4, etc.) determined in accordance with a transmission mode, a PUCCH format or the like in each single carrier of the multicarrier system.

In the PUCCH transmission mode mentioned in the foregoing description, if a multi-antenna transmission mode using multiple resources is switched to a single antenna transmission mode or a mode using a single power amplifier (PA) is used, it may be able to perform a predetermined correction in setting a transmission power. The same principle may be applicable to PUCCH format 2 series for CQI transmission or all newly-defined PUCCH formats as well as PUCCH format 1 series.

As one example of a case that a reception performance (e.g., PUCCH reception performance, etc.) of an eNode B is variable, it may correspond to a variation of the number of transmittable antennas of a mobile station, as mentioned in the foregoing description. Moreover, there is a power efficiency difference between a case that a mobile station transmits one data by clustered resource allocation and a case that a mobile station transmits one data on a single carrier.

In particular, when a mobile station performs a transmission in a clustered resource mode in configuring an operating region of a power amplifier (PA), it may be able to adjust a bias of the transmission power amplifier (PA) to prepare for the increase of a CM (cubic metric) of a corresponding transmitted signal irrespective of a single carrier or a multicarrier. On the other hand, a bias of a transmission power amplifier in a single carrier transmission mode may be set differently from that of a case of transmission on a clustered resource. Thus, if a bias of a transmission power amplifier is set small, it may be advantageous in that a signal can be transmitted with low power without signal distortion almost.

However, in case of the transmission on the clustered resource or the multicarrier transmission, unlike the case of the single carrier, resources are increased so that CM property is degraded. If a signal is transmitted at the same bias position of the power amplifier, signal distortion may occur. Therefore, it may be preferable to appropriately adjust the bias position of the transmission amplifier to avoid the occurrence of the signal distortion.

In addition to the above-mentioned power amplifier bias settings, a maximum power reduction (MPR) in a single carrier mode, a transmission mode via a clustered resource or a multicarrier mode may be set differently for a range available for a power amplifier. In this case, the available transmission power may be set differently in accordance with a resource allocation mode. Preferably, a maximum power value applies a value of the MPR (i.e., MPR of LTE Release-8) of the single carrier transmission mode in determining a transmission power in case that a mobile station operates in the single carrier transmission mode. Preferably, in case of the transmission mode via the clustered resource, a transmission power of a signal may be determined in a manner of applying the MPR defined for the corresponding clustered transmission or the multicarrier transmission to calculate a maximum power value. In doing so, the applied channel state may correspond to one of a case that PUCCHs are aggregated, a case that PUSCHs are aggregated, a case that one PUSCH resource configuration is clustered or localized, a case of a combination of PUCCH and PUSCH, and the like.

Moreover, for controlling of an eNode B on a transmission power, a mobile station may be able to make a report for a power headroom (PH) to the eNode B in consideration of an MPR value. In doing so, the eNode B may designate to report the power headroom with reference to a specific MPR. Alternatively, the mobile station may be able to report a power headroom by calculating it with reference to the MPR of Release 8 like LTE Release-8. In this case, the power headroom may be defined per component carrier or UL channel or may be defined into a single value.

The above descriptions mainly relate to the enhancement of performance reduction that may occur when a transmission mode (or a transmission antenna mode) dynamically changes in a transmitting method by SORTD (spatial orthogonal resource transmit diversity). However, under the prescribed circumstances, it may be unable to exclude the possibility in transmitting one information in one of various kinds of transmission modes. For instance, in a transmission method having best performance among the 1-resource based TXD (e.g., small delay CDD, slot level PVS (precoding vector switching, TSTD (time switched transmit diversity, etc.)) methods or 2-resource based TxD (e.g., SC-SFBC, STBC-II, FSTD, SORTD, etc.) methods mentioned in the foregoing description, it may be able to solve the problem of the performance reduction, which may occur in a dynamic change in each transmission method, using the offset value mentioned in the foregoing description. If the spatial orthogonal resource transmit diversity (SORTD) 2-Tx transmitting method expected to provide the best performance is switched to the slot level PVS in a situation that a 2-Tx transmission is provided maximumly, it may be able to predict a performance difference and then compensate for it.

Thus, although a mode is switched to a mode using the increasing or decreasing number of antennas, it may be able to maintain a received signal strength expected by an eNode B using a transmission power offset value. In doing so, the eNode B may be able to set a received signal strength which becomes a reference under the prescribed circumstances. For instance, in order to maintain a received signal strength of a transmission mode using a large number of antennas, it may be able to apply an offset value to a transmission power of a transmission mode using a small number of antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a mobile station apparatus for controlling a UL transmission power and method thereof are industrially applicable to such a communication system as 3GPP LTE, 3GPP LTE-A, IEEE 802 and the like.

What is claimed is:

1. A method for determining transmission power of a physical uplink control channel (PUCCH) in a wireless communication system, the method performed by a user equipment (UE) and comprising:
    receiving an offset value corresponding to a specific number of one or more antennas for transmitting the PUCCH;
    determining a transmission power value for the PUCCH using the offset value if the specific number of the one or more antennas are used for transmitting the PUCCH; and
    transmitting the PUCCH using the determined transmission power value,
    wherein the offset value is one of multi-level defined values and is defined separately for each format of the PUCCH.

2. The method of claim 1, wherein the offset value is for compensating for transmit diversity gain in accordance with the specific number of the one or more antennas for transmitting the PUCCH.

3. The method of claim 1, wherein the offset value is defined for respective one of the specific number of the one or more antennas for transmitting the PUCCH.

4. The method of claim 1, wherein the offset value is configured per specific time period.

5. The method of claim 1, wherein if the specific number of the one or more antennas is set to two (2), the transmission power value is determined using the offset value corresponding to the two (2) antennas and wherein the PUCCH is transmitted by a spatial orthogonal resource transmit diversity (SORTD) scheme via the two (2) antennas.

6. The method of claim 1, wherein the offset value comprises a value differing per the format of the PUCCH.

7. A user equipment (UE) that determines transmission power of a physical uplink control channel (PUCCH) in a wireless communication system, comprising:
    a receiver that receives information through one or more receiving antennas from an eNode B;
    a transmitter that transmits information through one or more transmitting antennas from an eNode B; and
    a processor that:
    controls the receiver to receive information from the eNode B or controls the transmitter to transmit information to the eNode,
    controls the receiver to receive an offset value corresponding to a specific number of antenna(s) for transmitting the PUCCH,
    determines a transmission power value for the PUCCH using the offset value if the specific number of antenna(s) is(are) used for the PUCCH; and
    controls the transmitter to transmit the PUCCH using the determined transmission power value,
    wherein the offset value is one of multi-level defined values and is defined separately for each format of the PUCCH.

8. The UE of claim 7, wherein the offset value is for compensating for transmit diversity gain in accordance with the specific number of the one or more antennas for transmitting the PUCCH.

9. The UE of claim 7, wherein the offset value is defined for respective one of the specific number of the one or more antennas for transmitting the PUCCH.

10. The UE of claim 7, wherein the offset value is configured per a specific time period.

11. The UE of claim 7, wherein if the specific number of the one or more antennas is set to two (2), the transmission power value is determined using the offset value corresponding to the two (2) antennas and wherein the PUCCH is transmitted by a spatial orthogonal resource transmit diversity (SORTD) scheme via the two (2) antennas.

12. The UE of claim 7, wherein the offset value comprises a value differing per the format of the PUCCH.

* * * * *